(12) United States Patent
Leinfelder

(10) Patent No.: US 8,948,930 B2
(45) Date of Patent: Feb. 3, 2015

(54) METHOD AND SYSTEM FOR OPERATING A VEHICLE BY MONITORING THE HEAD ORIENTATION AND/OR VIEWING DIRECTION OF AN OPERATOR BY MEANS OF A CAMERA DEVICE OF A MOBILE CONTROL DEVICE

(71) Applicant: Audi AG, Ingolstadt (DE)

(72) Inventor: Rudolf Leinfelder, Eichstätt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/974,455

(22) Filed: Aug. 23, 2013

(65) Prior Publication Data
US 2014/0058587 A1    Feb. 27, 2014

(30) Foreign Application Priority Data
Aug. 25, 2012   (DE) .......................... 10 2012 016 871

(51) Int. Cl.
G05D 1/00    (2006.01)
B62D 15/02   (2006.01)

(52) U.S. Cl.
CPC .......... *G05D 1/0011* (2013.01); *B62D 15/0285* (2013.01)
USPC ........................... 701/2; 701/117; 340/426.13

(58) Field of Classification Search
CPC .................................................. G05D 1/0011
USPC ............ 701/2, 36, 117; 340/426.13, 436, 989
See application file for complete search history.

(56) References Cited

FOREIGN PATENT DOCUMENTS

| | | |
|---|---|---|
| DE | 102009041587 | 3/2011 |
| DE | 102009051463 | 5/2011 |
| DE | 102011079703 | 1/2013 |
| EP | 1 249 379 | 10/2002 |
| EP | 2 316 709 | 5/2011 |
| JP | 2007-295033 | 11/2007 |
| WO | WO 2013/013871 | 1/2013 |
| WO | WO 2013013871 A1 * | 1/2013 |

* cited by examiner

*Primary Examiner* — Thomas G Black
*Assistant Examiner* — Luke Huynh
(74) *Attorney, Agent, or Firm* — Henry M. Feiereisen LLC

(57) ABSTRACT

A method for autonomously controlling a movement of a vehicle includes detecting a respective actual position of the vehicle in temporal succession; recording in temporal succession with a first camera device of a mobile control device images of an operator located outside the vehicle, the mobile control device being held by the operator; determining with an analysis device an actual head orientation and/or a viewing direction of the operator based on the recorded images; and interrupting or terminating the autonomously controlled movement of the vehicle in response to at least one of two instances, a first instance in which the actual head orientation and/or viewing direction of the operator cannot be detected, a second instance in which the head orientation and/or viewing direction of the operator deviates for longer than a predeterminable time period and/or by a predeterminable angle from the actual position of the vehicle.

10 Claims, 1 Drawing Sheet

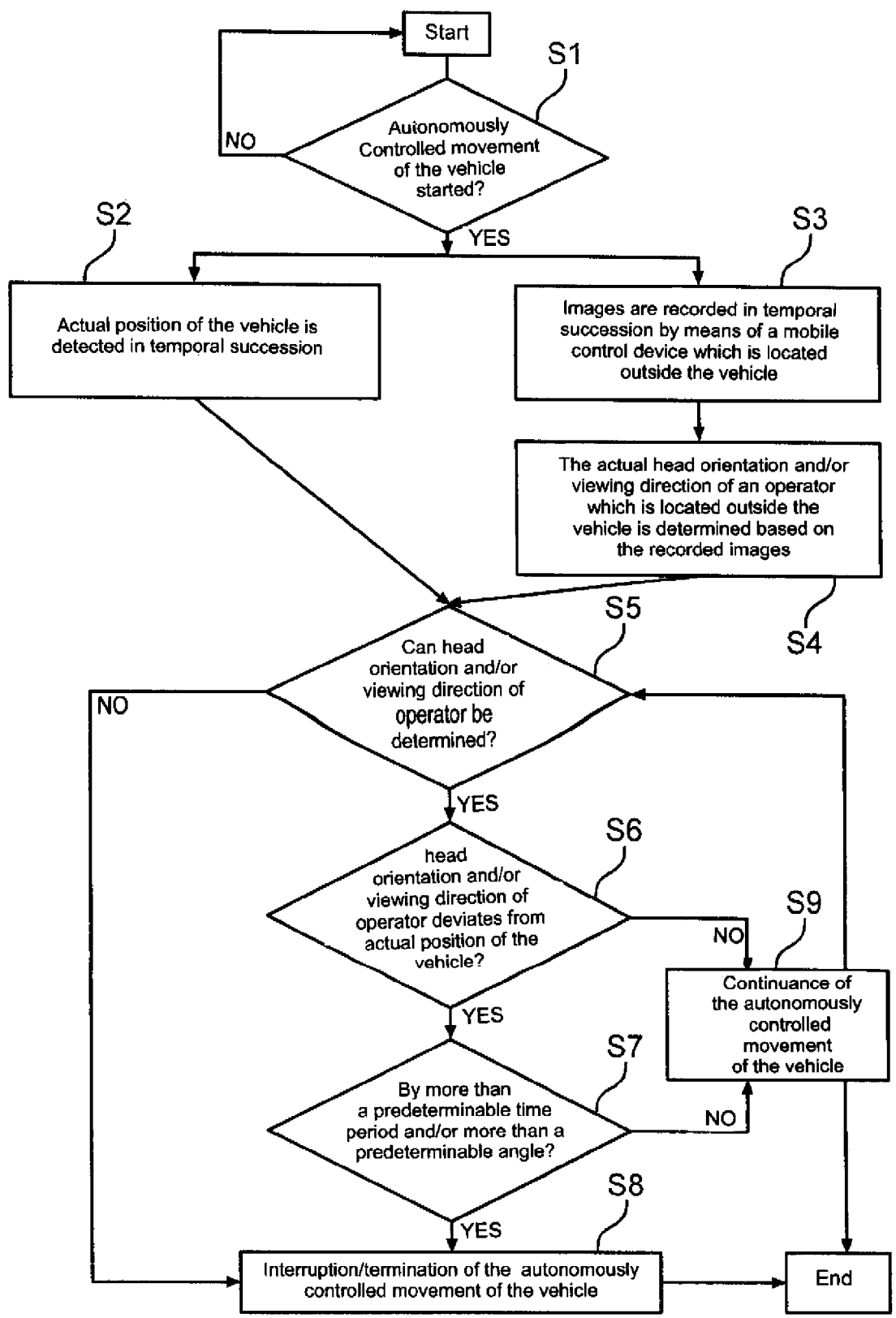

METHOD AND SYSTEM FOR OPERATING A VEHICLE BY MONITORING THE HEAD ORIENTATION AND/OR VIEWING DIRECTION OF AN OPERATOR BY MEANS OF A CAMERA DEVICE OF A MOBILE CONTROL DEVICE

CROSS-REFERENCES TO RELATED APPLICATIONS

This application claims the priority of German Patent Application, Serial No. 10 2012 016 871.3, filed Aug. 25, 2012, pursuant to 35 U.S.C. 119(a)-(d), the disclosure of which is incorporated herein by reference.

BACKGROUND OF THE INVENTION

The present invention relates to a method and system for operating a vehicle by monitoring the head orientation and/or viewing direction of an operator by means of a camera device of a mobile control device.

The following discussion of related art is provided to assist the reader in understanding the advantages of the invention, and is not to be construed as an admission that this related art is prior art to this invention.

In recent years many efforts were undertaken and technical solutions have become known with which a vehicle, in particular a motor vehicle can be controlled autonomously.

In an autonomous control of a vehicle, which oftentimes is also referred to as "piloted driving", the vehicle is moved predominantly by means of sensors and actuators (also referred to as actuating system) of the vehicle without a driver directly controlling the vehicle.

One example for piloted driving re parking-steering-assist systems, which enable an automatic parking and unparking of a vehicle.

For example, EP 1 249 379 A2 describes a method for maneuvering a motor vehicle into a target position, wherein the motor vehicle is brought into a starting position close to the desired target position, the environment of the motor vehicle is traced after a first activation by the driver, which tracing is continuous at least for detecting the target position, and the actual position of the vehicle is continuously determined, items of control information for maneuvering the motor vehicle into the target position ire determined by means of the determined environmental and positional information, after a second activation by the driver, control commands which depend on the control information are outputted to the drive train and/or the braking system and/or the steering of the motor vehicle, thereby causing the motor vehicle to drive into the target position independent of the driver.

DE 10 2009 051 463 A1 discloses a vehicle with associated external control device and a parking-steering-assist system including a control device situated in the motor vehicle is known, wherein the external control device is configured for communication with the control device of the motor vehicle, and the control device of the motor vehicle is configured for determining a positional information regarding the location of the driver and/or a target position set by the driver by taking the signals that have been transmitted during the communication into account, wherein an unparking procedure which is controlled by the control device of the motor vehicle can be carried out by taking the positional information to account.

Such autonomous or piloted driving processes of a (motor) vehicle require that the driver always has to be able to intervene in the process in particular to terminate the process. Thus, the already mentioned EP 1 249 379 A1 describes that an automatic parking and ranging process can be started and interrupted by means of a transmission device. The automatic parking or ranging process is only maintained so long as the driver maintains contact with the vehicle for example by pressing a parking or ranging button on the transmission device. When the button is released the parking and ranging process is immediately interrupted and the vehicle is automatically stopped. The transmission device can for example be integrated in the ignition key or in a mobile phone.

Further a driver assist device for a motor vehicle with a control device is known from DE 10 2009 041 587 A1 which is configured to output control signals to the drive and/or steering device of the motor vehicle which cause an automatic execution of the parking process, and to receive commands from a remote control and after receiving a pre-determined interruption command, to interrupt an already initiated parking process of the motor vehicle, wherein at least one camera which is coupled with the control device is provided for obtaining image data relating to a vicinity of the motor vehicle, wherein the control device is configured to send signals to the remote control which signals include the image data obtained by the camera and/or image data calculated from the signal. The driver is supported by this driver assist device during monitoring an autonomous parking procedure of the motor vehicle in that images relating to a vicinity of the motor vehicle are displayed to the driver on a display device of the portable or mobile remote control. The driver can thus see objects in the vicinity of the motor vehicle and as the case may be terminate the autonomous parking procedure in case of a dangerous situation.

The driver assist device known from DE 10 20009 041 587 A1 is disadvantageous in as far as a driver has to observe a relatively small display device in case of a mobile remote control and has to decide based on the representations displayed on the remote control whether a dangerous situation exists or not. However, due to the relatively small size of the display device, details of the recorded vicinity cannot or can only inaccurately be recognized. This situation is exacerbated in case of bright ambient light because in this case the displayed images and items of information are often not or only poorly recognizable.

It would therefore be desirable and advantageous to provide to provide an improved method and system for operating a vehicle

SUMMARY OF THE INVENTION

According to one aspect of the present invention, a method for operating an vehicle is proposed wherein the vehicle carries out in the Thomas E controlled movement. The method according to the invention is characterized in that the respective actual position of the vehicle is detected in temporal sequence, Images are detected by means of a first camera device of a mobile control device which is held by an operator which is located outside the vehicle, an actual head orientation and/or viewing direction of the operator is determined by an analysis device based on the detected images, and in the case that the actual head orientation and/or viewing direction of the operator cannot be determined for the head orientation and/or viewing direction of the operator deviates from the actual position of the vehicle for longer than a predetermined duration and/or by more than a predetermined angle, the autonomously controlled movement of the vehicle is automatically interrupted or terminated.

During the autonomously or piloted movement of the vehicle, on one hand the respective actual position of the vehicle is thus detected and on the other hand the respective actual head orientation and/or viewing direction of the operator. In predetermined situations for example and it is determined that the operator does not look in the direction of the (motor) vehicle for longer than a predetermined period of time, the autonomously or piloted movement of the (motor) vehicle is automatically interrupted or terminated without necessitating an active intervention by the operator.

The method according to the invention has the advantage compared to the state-of-the-art that an operator (who is often the driver of the vehicle) who is located outside of the vehicle during the autonomous or piloted movement of the vehicle, has to have the vehicle and its movement in his view in order for this movement not to be automatically interrupted or terminated.

According to a first advantageous refinement of the invention, the actual position of the vehicle is detected by means of (a) images that are recorded in temperate succession, wherein the images are recorded by a second camera device of the mobile control device, and/or (b) data relating to the actual position or data relating to a starting position a speed and/or base speed profile and a direction and/or a directional profile.

According to the above option (a), the advantage results that both required items of information (actual position of the vehicle; and orientation and/or viewing direction of the operator) are detected by only one device. It is further advantageous that the orientation of the detection range of the second camera device in the direction towards the vehicle is required which often also directs the viewing direction of the operator in the direction of the vehicle, thereby the criteria for continuing the autonomously controlled movement of the vehicle are satisfied.

When the mobile control device for example does not have a second camera device, the position of the vehicle can be detected according to option (b) for example by means of data relating to the actual position or data relating to the starting position, a student and/or its profile and a direction and/or a directional profile. The data relating to an actual position for a starting position of the vehicle can for example be obtained by means of a module inside the vehicle for satellite supported position determination (GPS). When the position of a vehicle can be accurately determined within the range of a few decimeters by means of currently available satellite supported position determination it can be expected that future developments will allow a satellite supported position determination with accuracy of a few centimeters. And the data relating to a speed and/or a speed profile and a direction and/or a direct of profile can for example be provided by a control device of the vehicle.

According to the invention the determination of the absolute position of the vehicle during carrying out the method according to the invention is however not required but it is sufficient position of the vehicle relative to the operator is determined.

According to a second advantageous refinement of the invention a smartphone is used for the method as mobile control device. Practically all modern mobile phones (which are currently usually referred to as "smartphones") have at least one camera device. With this it is possible at least in temporal sequence to detect images in which the head of the operator is pictured. Because smartphones usually also include further devices such as a digital compass, a positional sensor, an acceleration sensor, a GPS module etc., not only the relative head orientation and/or viewing direction of the operator relative to the smartphone can be determined in combination with a appropriate analysis software or analysis device, but also the head orientation and/or viewing direction in the three-dimensional space (direction, horizontal and vertical direction) and that is also relative to the actual position of the vehicle. Of course this does not only apply to smartphones but also for all mobile or portable control devices which are configured appropriately.

According to a further advantageous refinement of the invention a digital calculating unit in the mobile control device and/or in the vehicle's used as the analysis device. For example modern smartphones have already today powerful processors with up to four cores from processing a large number of calculations per second. Similarly powerful processors for calculating devices are used for diverse calculation tasks in (motor) vehicles. This available processing capacity, which in the coming years will most likely further increase, can economically be used for the method according to the invention.

According to a further advantageous refinement of the invention data are transmitted between vehicle and mobile control device by means of a wireless radio connection by using a radio standard according to IEEE-802.11a, IEEE-802.11b, IEEE-802.11g, IEEE-802.11n, IEEE-802.15.1, IEEE-802.15.2, IEEE-802.15.3, IEEE-802.15.4, a modification and/or further development thereof or a mobile radio standard. By means of these radio standards—which are implemented in many (motor) vehicles and mobile control devices such as smartphones—the wireless data exchange can be realized in a cost-effective and at the same time reliable manner.

It is further advantageous when for starting the autonomously controlled movement of the vehicle, a signal is sent to the vehicle by the operator which is located outside the vehicle by means of a handheld transmitter and/or the mobile control device. The same applies when a signal can be sent wirelessly to the vehicle by the operator who is located outside the vehicle by means of a handheld transmitter and/or the mobile control device for interrupting or terminating the autonomously controlled movement of the vehicle.

The method according to the invention is not limited to a particular type of the autonomously controlled movement of the vehicle it can however in particular be used for an autonomous parking procedure an autonomous unparking procedure and/or an autonomous continuance of the drive. It is further advantageous when according to a further advantageous refinement of the invention the images which are recorded by the camera device of the mobile control device in temporal succession are displayed in real-time on a display device of the control device.

The present invention also includes a system for operating a vehicle, which includes a vehicle and a mobile control device which are configured for implementing the method according to the invention or one of its advantageous refinements.

BRIEF DESCRIPTION OF THE DRAWING

Other features and advantages of the present invention will be more readily apparent upon reading the following description of currently preferred exemplified embodiments of the invention with reference to the accompanying drawing, in which the sole FIGURE shows a schematic diagram of an example for the sequence of steps of the method according to the invention

DETAILED DESCRIPTION OF PREFERRED EMBODIMENTS

Throughout all the FIGURES, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In the flow diagram shown in the FIGURE according to a preferred exemplary embodiment of the present invention, it is checked in the first step S1 whether an autonomously controlled movement of a vehicle was started. This can for example occur by reading out the state of a control device, which is provided for an autonomously controlled movement of a vehicle, or by detecting a corresponding control command.

When this check shows that an autonomously controlled movement of the vehicle was started the actual position of the vehicle is detected in temporal sequence according to step S2. The detection of the position of the vehicle can occur in any appropriate manner, for example by means of satellite supported position determination. Because it does not matter for the method according to the invention to determine the position of the vehicle with the accuracy of a few centimeters, the accuracy of a position determination by means of the currently available GPS is sufficient for carrying out the method according to the invention.

The respective actual position of the vehicle can for example also be determined via the determination of a starting position of the vehicle (for example by means of GPS) at the beginning of the method and a subsequent detection of the speed and/or a speed profile and the direction and/or a directional profile (steering angle, steering behavior) of the vehicle. These data can be provided by a corresponding device in the vehicle.

Also the actual position of a vehicle can be rather accurately determined for example by means of the data of a GPS-module in connection with the data of a navigation system and data of a vehicle-side camera device (with which a vicinity of the vehicle can be detected and whose images were analyzed by an image analysis program which is configured therefore).

As already mentioned, according to the invention it is not required that the actual position of the vehicle is determined absolute i.e., by determining defined coordinates (longitude and latitude), rather it is sufficient to determine the actual position of the vehicle relative to the operator who is located outside the vehicle.

This can be achieved in a particularly elegant manner when the mobile control device has a second camera device with which images of the vehicle can be recorded in temporal sequence. For example, the majority of modern mobile phones which can be used as mobile control device according to a further refinement of the present invention, have a first and a second camera device.

The first camera device is arranged on the side of the smartphone on which the (main) display device (display) is also located. Such first camera devices are usually provided in smartphones for video-telephony. By means of such first camera devices images of the head of the operator can advantageously be recorded in temporal sequence, as explained in the following with regard to the step S3 shown in the FIGURE.

On the side, which is opposite to the (main) display, most smartphones have a second camera device, which is usually provided for recording stationary and/or moving images (photos and/or videos). By means of this second camera device images of the vehicle can advantageously be recorded in temporal sequence, which can serve for determining the actual position of the vehicle in step S2.

The images of the vehicle which were recorded by means of the second camera device can be analyzed by an appropriate analysis software or analysis device to determine in what region of the recorded image the vehicle is located for example in which angle the vehicle is located relative to the central axis of detection of the second camera device. When the smartphone has a mobile second camera device it can of course also be determined in which angle the vehicle is located relative to another immobile element of the smartphone. Such another immobile element of the smartphone can form example represent an imagined central axis or a surface (for example the main display) of the smartphone.

At the same time or in immediate temporal proximity with the detection of the actual position of the vehicle, images are recorded in temporal succession in step S3 by means of a first camera device of a mobile control device. These images serve for determining the actual head orientation and/or viewing direction of the operator. For this, the actual head orientation and/or viewing direction of the operator are determined in step S4 on the basis of the images detected by the first camera device by means of for example an appropriate image analysis software or device or it is at least attempted to determine the actual head orientation and or viewing direction of the operator.

The head orientation and/or viewing direction of the operator can for example be determined in that the images which are detected by the first camera device are analyzed by an appropriate image analysis software or device and a head which is recognized in the images is analyzed for example with regard to the position of the eyes, the position of the ears and/or the position of the nose. This allows determining the head orientation and/or the viewing direction of the operator relative to the first camera device of the mobile control device or relative to the mobile control device.

Oftentimes it not necessary to determine the concrete viewing direction of the driver, but it is sufficient when the head orientation is determined. Because on one hand, the head orientation of a human allows drawing relatively accurate conclusions with regard to his viewing direction, because humans usually orient their head in the actual viewing direction. On the other hand accurate determination of the viewing direction of a human is oftentimes not necessary because a human with healthy eyes also perceives things that are located outside his viewing direction axis (essentially predetermined by the head orientation).

If an operator holds the mobile control device during detection of the images by the first camera device in a manner in which his head is located outside the detection range of the first camera device or in which his head is not contained in the images with sufficiently completeness quality and/or size, the actual head orientation and/or viewing direction can of course not be determined by means of the mentioned image analysis software or device.

Therefore it is checked or queried in step S5 whether the head orientation and/or viewing direction of the operator could be determined. If the result of this check or query is negative i.e., it cannot be determined in which direction the operator currently views and it can therefore also not be ensured that the operator views the autonomously controlled moving vehicle, step S8 is initiated in which the autonomously controlled movement of the vehicle is terminated or interrupted. When the term such as "terminated" is used in the present application this can also mean that the autonomously controlled movement of the vehicle does not start in the first place the "termination" thus occurs immediately after the start signal for the autonomously controlled movement.

When the query or check yields a positive result in step St5, i.e. the actual head orientation and/or viewing direction of the operator could be determined in step S4, it is queried or checked in step S6 whether the head orientation and/or viewing direction of the operator deviates from the actual position of the vehicle.

This requires a comparison of the actual position of the vehicle determined in step S2 with the actual head orientation and/or viewing direction of the operator determined in step S4. Such a comparison can be performed in any appropriate manner.

When for example the mobile control device only has a first camera device, only the actual head orientation and/or viewing direction of the operator can be determined by the mobile control device itself. By means of further devices of the mobile control device (for example of a GPS module, a position sensor, an acceleration sensor etc.) the actual position of the mobile control device (which is held buy the operator) and the head orientation and/or viewing direction of the operator (respectively in horizontal and vertical orientation and the orientation in space or direction) can be determined.

As already mentioned above, in such a case the actual position of the (motor) vehicle can for example be determined by means of a GPS module. Thus for the comparison the actual position of the mobile control device, the viewing direction of the operator based on the mobile control device and the actual position of the (motor) vehicle are available. This allows to easily test whether the actual viewing direction and/or head orientation of the operator (at least to a sufficient degree) points in the direction of the actual position of the (motor) vehicle.

Even easier is the query or check in step S6, as far as the mobile control device has a second camera device and mages of the vehicle are recorded in temporal succession with the second camera device. In this embodiment of the method according to the invention the actual position of the vehicle and the actual head orientation and/r viewing direction of the operator can thus be detected with only one device and as the case may be also determined and analyzed.

For this an absolute position determination of the vehicle and the mobile control device is not needed, rather it is sufficient to determine (for example with an appropriate image analysis software) the position of the vehicle in the images that have been recorded (for example relative to the central detection axis of the second camera device) with the second camera device and the viewing direction and/or head orientation of the operator relative to the images that have been recorded by the first camera device.

When the operator chooses to detect the position of the vehicle with the second camera device, a further advantage is that he will usually hold the smartphone in the same manner when taking pictures or recording videos. He will thus hold the mobile control device (the smartphone) in front of himself at eye-level. This is especially the case when—according to an advantageous refinement or the present invention—the images of the vehicle which have been recorded in temporal succession are displayed in real time on the (main) display of the mobile control device. In such an embodiment of the method according to the invention, the detection of the actual position of the vehicle is thus comparable to a situation of recording a video by means of the smartphone. As a result, the viewing direction and/or head orientation of the operator will normally point in the direction of the autonomously controlled vehicle so that termination or interruption of the autonomously controlled movement of the vehicle is necessitated less frequently than in other embodiments of the method according to the invention.

A further advantage of this embodiment, due to the above mentioned holding of the mobile control device at about eye-level, is that the head of the operator can also be detected with high probability by the first camera device of the mobile control device.

When the images of the vehicle that have been recorded in temporal succession are displayed in real time on the (main) display of the mobile control device, the images can be the detected images themselves, however it is also possible that as a result of the analysis carried out by the analysis device the images are modified for example so as to be better optically recognizable for the human eye, contain a stylizing, are limited to the depiction of the vehicle, and/or contain further items of information (for example an indication of possible sites of danger).

By comparing the results of steps S2 and S4 it can be determined whether the head orientation and/or viewing direction of the operator deviates from the position of the vehicle.

Both of the above mentioned embodiments of the method according to the invention often require transmission of data from the vehicle to the mobile control device or data from the mobile control device to the vehicle, data are exchanged between the vehicle and the mobile control device or data are transmitted from the vehicle and/or the mobile control device to an analysis device.

Thus, data relating to an actual position of the vehicle can for example be transmitted from the vehicle to an analysis device provided in the mobile control device. Or data relating to the actual head orientation and/or viewing direction of the operator to an analysis device in the vehicle. Or control demands relating to a continuance and/or relating to a termination or interruption of the autonomously controlled movement of the vehicle from the mobile control device to a corresponding control device in the vehicle.

Here it is preferred that the data are transmitted by means of a wireless radio connection. Suited examples are the radio standards according to IEEE-802.11a, IEEE-802.11b, IEEE-802.11g, IEEE-802.11n (also referred to as wireless Lan-, WLAN- or Wi-Fi standards), IEEE-80215.1, IEEE-802.15.2, IEEE-802.15.3, IEEE-802.15.4 (also referred to as wireless personal area network, WPAN or Bluetooth standards), modifications and/or for the developments there off or a mobile radio standard. In particular the third right use standards according to the IEEE-802 family appear currently as particularly suited for a sufficiently fast and reliable wireless communication over the relatively short distances that are given in the context of the method according to the invention.

When the query or check in step S6 yields that the head orientation and/or viewing direction of the operator does not deviate from the actual position of the vehicle the autonomously controlled movement of the vehicle is continued. If on the other hand a deviation of the head orientation and/or viewing direction of the operator from the actual position of the vehicle is detected in step S6 it is tested in the subsequent step S7 whether a deviation by more than a predeterminable time period and/or by more than a predeterminable angle exists.

In this regard the threshold values for the time period as well as for the angles can be selected in an appropriate manner. For example as duration for which the head orientation and/or viewing direction of the operator is permitted to deviate from the actual position of the vehicle can be set to be 0.1 s, 0.2 s, 0.3 s, 0.4 s, 0.5 s, 0.6 s, 0.7 s, 0.8 s, 0.9 s, or 1 s. The time period can also be determined dynamically, for example a longer time period when a sensor system of the vehicle does not detect any obstacles in the immediate vicinity of the vehicle and a shorter time period or a time period that is the shorter the closer obstacles are present in the immediate vicinity of the vehicle. The speed of the vehicle can also be used to determine the (dynamic) time period.

Similar considerations apply for the permitted threshold values of the deviation of the head orientation and/or viewing direction of the operator from the actual position of the vehicle. As mentioned above, a certain deviation of the head orientation and/or viewing direction of the operator from the actual position of the vehicle can oftentimes be tolerated because humans can also perceive items with their eyes which are located outside of the central viewing axis. Therefore a threshold valued that is still permissible for a deviation of the head orientation and/or viewing direction of the operator from the actual position of the vehicle an angle of 5°, 10°, 15°, 20°, 25°, 30°, 35°, 40° or 45° can be predetermined. Similar to the discussion with regard to the permissible time period above, the permissible deviation angles can also be selected differently depending on an actually given driving situation.

When it is determined in step S7 that all deviations lie within the predeterminable threshold values, the autonomously controlled movement of the vehicle is continued according to step S9. If at least one of the deviations exceeds the permissible predetermined threshold value, the autonomously controlled moment of the vehicle is terminated or interrupted according to step S8. However it can also be provided that S8 is also initiated in response to a combination of a per se tolerable deviation with regard to the time period and a per se tolerable deviation with regard to the viewing direction and/or head orientation of the operator from the actual position of the vehicle.

There are no particular limitations with regard to the analysis devices that can be used for carrying out the method according to the invention. For example data relating to the position of the vehicle can be analyzed in an analysis device of the vehicle, and the images that have been detected by the first or as the case may be second camera device can be analyzed in an analysis device of the mobile control device. The data that have been detected by/in a device (vehicle, mobile control device) can for example also be transmitted per radio to an analysis device of the other device (mobile control device, vehicle) and analyzed there. As analysis device(s) for example a digital calculating device in the mobile control device and/or in the vehicle can be used in which a respective appropriate computer program is installed ready to be run. Also pure hardware solutions are also conceivable as analysis device.

The term temporal sequence in the present application includes all appropriate time intervals. Thus, for example recordings of the vehicle can be detected in a temporal interval of ⅓₀s, ½₀s, ⅟₁₅s, ⅕s. According to the invention no particular temporal interval is required for the respective detection, rather any temporal interval that is appropriate for a given situation can be used.

As mentioned above, the method according to the invention is not limited to a particular manner of an autonomously controlled movement of the vehicle. In the presently preferred manner, a method according to the invention can however be used for an autonomous parking procedure, autonomous unparking procedure and/or an autonomous continuance of the drive. Thus, the method according to the invention can advantageously for example be used for an autonomously controlled continuance of the drive in the area of agriculture and forest management and in the area of delivery services (post and postal services).

Not shown in the FIGURE but of course within the scope of the invention are further steps that can be carried out for performing the method according to the invention. Thus, for example after termination/interruption of the autonomously controlled movement of the vehicle in step S9, the method may not only be terminated, but also as the case may be can be returned to the starting point after a predeterminable period of time and/or a renewed control action by the operator or as the case may be (if the autonomously controlled movement was only interrupted) to a subsequent step such as step S5. The continuance of the autonomously controlled movement of the vehicle in step S9 is normally only carried out until for example it's successful execution or termination is determined by a control device of the vehicle.

It can further be provided in the method according to the invention that information relating to the vehicle to be observed is stored in the mobile control device, items of information relating to the mobile control device are stored in the vehicle to be observed and/or an effective and appropriate communication between the mobile (portable) control device and the vehicle occurs so that it can be ensured that the method according to the invention occurs between the "right" vehicle and the "right" mobile control device.

It can also be provided that an image of the head and/or corresponding (biometric) data of the head of the operator are stored in the mobile control device in order to ensure that a head that was detected by the first camera device is actually the head of the operator and not the head of a another person.

The autonomously controlled movement of the vehicle may also be terminated or interrupted at any time by the control device of the vehicle for example when the control device of the vehicle detects an obstacle or a malfunction of the sensor system of the vehicle and/or actuating system of the vehicle.

Further it can also be provided in a step that is not shown in the FIGURE that the detected images are analyzed with regard to quality. In this regard it can be tested or analyzed for example whether the head of the operator and/or images of the vehicle were sufficiently detected in the detected images. What is meant by "sufficiently" can be predetermined in any appropriate manner. For example it can be provided as a threshold value that certain threshold values with regard to brightness and/or contrast has to be satisfied in the detected images.

The present invention also relates to a system for operating a vehicle which is characterized in that it includes a vehicle and a mobile control device which is configured for carrying out the method according to the invention according to one of the claims 1 to 9.

The above description of the method according to the invention allows a person with skill in the art to determine which devices (control devices, sensor system actuating system) are required for an autonomously controlled movement. A person with skill in the art also knows by means of which devices of the vehicle for example a communication with the mobile control device can be ensured (for example by exchanging data for starting/stopping/terminating/interrupting the autonomously controlled movement).

Similar considerations apply with regard to the features of the mobile control device (camera device, optionally display device, communication possibilities with the vehicle etc.)

Also with regard to the analysis device a person with skill in the art knows what is required or appropriate. Similar considerations apply for the computer programs executed on the analysis device.

As far as a selection, recognition, and tracking of one or more objects in the detected images is required or is carried out in the present invention, many appropriate currently available or future available solutions (methods/devices) can be used.

The following is typical example of carrying out the method according to the invention.

An operator (driver) is looking for a parking lot, has detected a parking lot and the size and suitability of the parking lot is measured and determined by the sensor system of the vehicle to be at least sufficient. The operator (driver) stops the vehicle in the vicinity of the parking lot and leaves the vehicle.

In order to initiate or carry out the autonomously controlled parking procedure, the operator sends a signal per radio or by means of a handheld transmitter (which can for example be located in the ignition key) and/or the mobile control device, to the vehicle for starting the autonomously controlled parking procedure. Such a signal can for example be triggered by means of pushing a button of the mobile control device, a pushing of an icon displayed on the mobile control device or by means of a voice command.

Subsequent thereto, the mobile control device receives data from the vehicle relating to its actual position. At the same time or shortly thereafter the first camera device of the mobile control device (smartphone) starts to record images in temporal succession. These images are analyzed by an analysis device which for example is present in the mobile control device. When the head of the operator can be recognized in sufficient quality in the images and his head orientation and/or viewing direction can be determined and the other criteria for the start or the continuance of the autonomously controlled parking procedure are satisfied, a corresponding signal is sent per radio from the mobile control device to a corresponding device of the vehicle.

Subsequent thereto, the vehicle starts with the autonomously controlled parking procedure. During the duration of the parking procedure images taken by the camera device are continued to be analyzed by the mobile control device. When the criteria for continuing the autonomously controlled parking procedure are satisfied, the vehicle continues with the autonomous parking procedure. When the criteria for continuing the autonomous parking procedure are no longer satisfied a signal for terminating or interrupting the autonomously control parking procedure is sent by the mobile control device to the vehicle whereupon the vehicle terminates or interrupts the parking procedure in particular stops its movement as fast as possible.

When the criteria for continuing the autonomous parking procedure are satisfied again, for example when the operator holds the mobile control device properly again, a signal can either automatically be sent from the mobile control device to continue the parking procedure or such a signal can be triggered by a control action of the operator.

During carrying out the autonomous control parking procedure, the operator has also the option as far as he so desires to send a signal per radio by means of a handheld transmitter and/or the mobile control device to the vehicle to interrupt or terminate the autonomously controlled movement of the vehicle.

When the vehicle has reached its autonomously controlled end position, the method according to the invention can be terminated for example by transmission of a corresponding signal from the vehicle to the mobile control device. The end of the method according to the invention can be signaled to the operator by a corresponding display on the display of the mobile control device, by a corresponding signal tone or by a corresponding voice output.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for autonomously controlling a movement of a vehicle, comprising:
   detecting a respective actual position of the vehicle in temporal succession;
   recording in temporal succession with a first camera device of a mobile control device images of an operator located outside the vehicle, said operator holding the mobile control device;
   determining with an analysis device at least one of an actual head orientation of the operator and a viewing direction of the operator based on the images recorded with the camera device; and
   interrupting or terminating the autonomously controlled movement of the vehicle in response to at least one of two instances, a first instance in which the actual head orientation and/or viewing direction of the operator cannot be detected, a second instance in which the head orientation and/or viewing direction of the operator deviates for longer than a predeterminable time period and/or by a predeterminable angle from the actual position of the vehicle.

2. The method of claim 1, wherein the actual position of the vehicle is detected by means of at least one of recording images of the vehicle in temporal succession with a second camera device of the mobile control device and data relating to the actual position or data relating to at least one member selected from the group consisting of a starting position of the vehicle, a speed of the vehicle, a speed profile of the vehicle, a direction and a directional profile.

3. The method of claim 1, wherein the mobile control device is constructed as a smartphone.

4. The method of claim 1, wherein the analysis device is constructed as a calculation device and is situated in the mobile control device or in the vehicle.

5. The method of claim 1 further comprising transmitting data between the vehicle and the mobile control device by means of a wireless radio connection by using a radio standard according to a member selected from the group consisting of IEEE-802.11a, IEEE-802.11b, IEEE-802.11g, IEEE-802.11n (also referred to as wireless Lan-, WLAN- or Wi-Fi standards), IEEE-80215.1, IEEE-802.15.2, IEEE-802.15.3, IEEE-802.15.4 and further developments thereof or by using a mobile radio standard.

6. The method of claim 1, further comprising transmitting a signal per radio to the vehicle by the operator located outside the vehicle by means of a handheld transmitter and/or the mobile control device for starting the autonomously controlled movement of the vehicle.

7. The method of claim 1, further comprising transmitting a signal to the vehicle by the operator located outside the vehicle by means of a handheld transmitter and/or the mobile control device to interrupt or terminate the autonomously controlled movement of the vehicle.

8. The method of claim 1, wherein the autonomously controlled movement includes at least one of an autonomous parking procedure, an autonomous unparking procedure and an autonomous continuance of a drive of the vehicle.

9. The method of claim 1, wherein the image that have been recorded in temporal succession by the camera device of the mobile control device are displayed in real time on a display device of the mobile control device.

10. A system for operating a vehicle, comprising:
a vehicle; and
a mobile control device, said vehicle and said mobile control device being configured for implementing the method of claim 1.

* * * * *